INVENTORS
Robert David MacGregor Whitelaw
and
Alistair William Holmes Lawson Wright
BY
Misegades & Douglas
ATTORNEYS ated July 29, 1969

United States Patent Office 3,458,742
Patented July 29, 1969

---

3,458,742
ALTERNATING CURRENT GENERATORS HAVING ROTATING ARMATURE WITH RETAINING RINGS FOR THE ARMATURE WINDING END TURNS
Robert David MacGregor Whitelaw and Alistair William Holmes Lawson Wright, Stafford, England, assignors to The English Electric Company Limited, London, England, a British company
Filed July 20, 1967, Ser. No. 654,730
Claims priority, application Great Britain, July 20, 1966, 32,536/66
Int. Cl. H02k 3/46
U.S. Cl. 310—270        8 Claims

ABSTRACT OF THE DISCLOSURE

In an alternating current generator having a rotatable armature in which the alternating current output is generated and in which the armature end turns extend beyond the body of the armature and are held in position by a supporting ring or end bell shrunk on to the body of the armature, very heavy eddy currents can flow in the supporting ring or end and lead to an intolerable degree of heating. The present invention overcomes this disadvantage by providing a sub-divided end bell comprising a plurality of annular metal ring members which are located relative to one another and secured together and to the armature body in such a manner as to prevent the flow of any substantial eddy currents between one member and the or each adjacent member, or between any member and the body of the armature. This arrangements is of particular use with brushless direct current generators having rotating rectifiers.

---

This invention relates to alternating current generators of the type having a rotatable armature. This type of generator is of particular use for a brushless direct current generator in which alternating current is generated in the amature and rectified by a rotating rectifier network.

Such a brushless direct current generator can be used for exciting the rotating direct current field of a large turbine driven alternating current generator and since these latter generators are being made of ever increasing ratings brushless direct current generators for this purpose can be expected to be required to supply energisation for the rotating field of, for example a 500 mw. alternating current generators.

A brushless direct current generator required to supply such energisation is itself a large machine having winding end turns extending beyond the body of the armature and these end turns have to be secured against the effect of centrifugal force. With such a relatively large machine the most effective way of securing the end turns would be to surround them by an annular metal supporting ring or end bell, shrunk onto the body of the armature such as is used for the rotatable direct current field of a large alternating current generator.

However, with a rotatable armature which carries alternating current, eddy currents would flow in the metal supporting rings or end bells and these can cause a degree of heating which could not be tolerated.

According to one aspect of the invention there is provided an alternating current generator having a rotatable armature in which the armature winding end turns which extend beyond the body of the armature are held in position by a plurality of annular metal ring members, these members being located relative to one another and secured together and to the armature body in such manner as to prevent the flow of any substantial eddy currents between one member and the or each adjacent member or between any member and the body of the armature.

According to a further aspect of the invention the metal members are located relative to one another and secured together such that any one member makes electrical contact with the or each adjacent member only at a number of locations equal to half the number of poles of the armature winding and symmetrically spaced about the member, any member mounted directly on the armature body being secured thereto so that it makes electrical contact with the annular body at a like number of symmetrically spaced locations.

Figure 1:
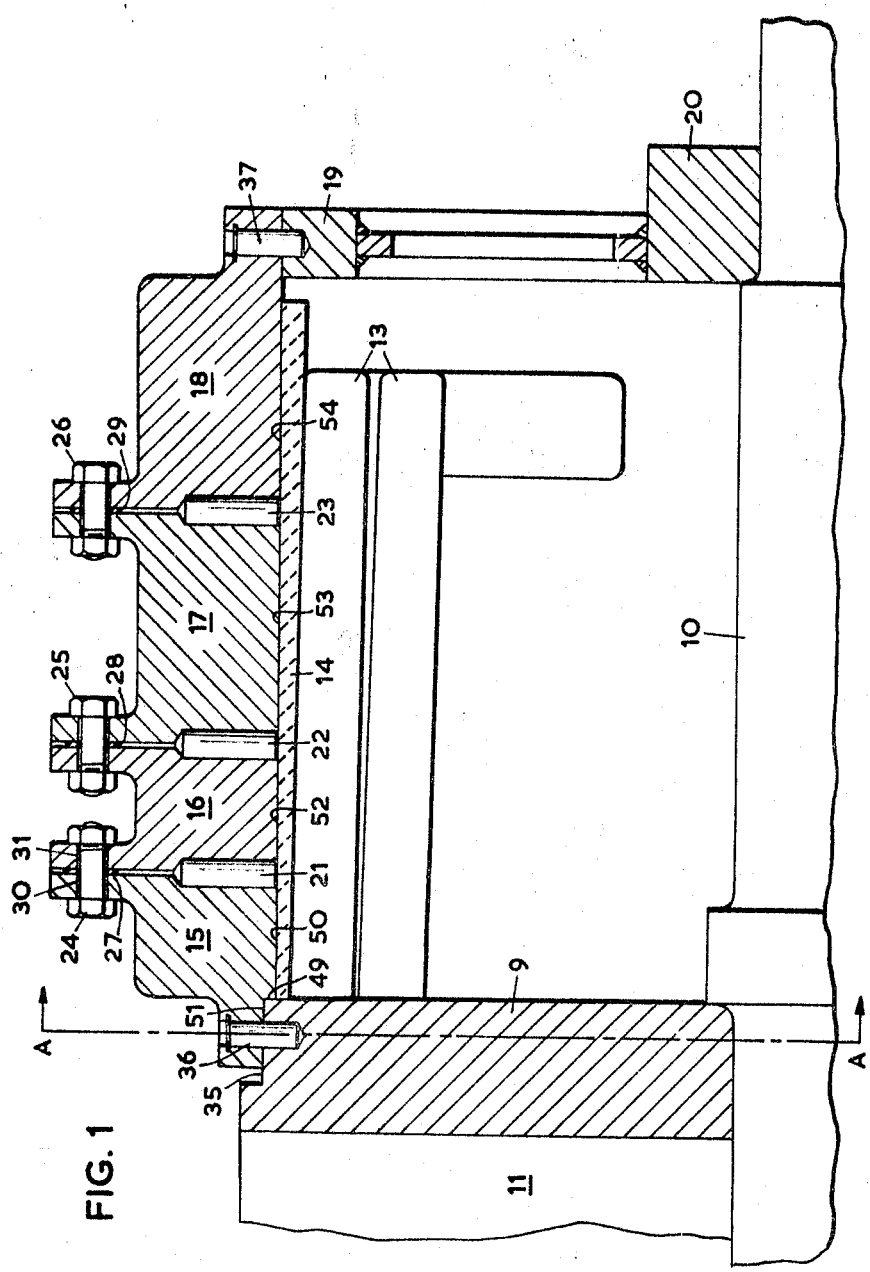
Figure 2:
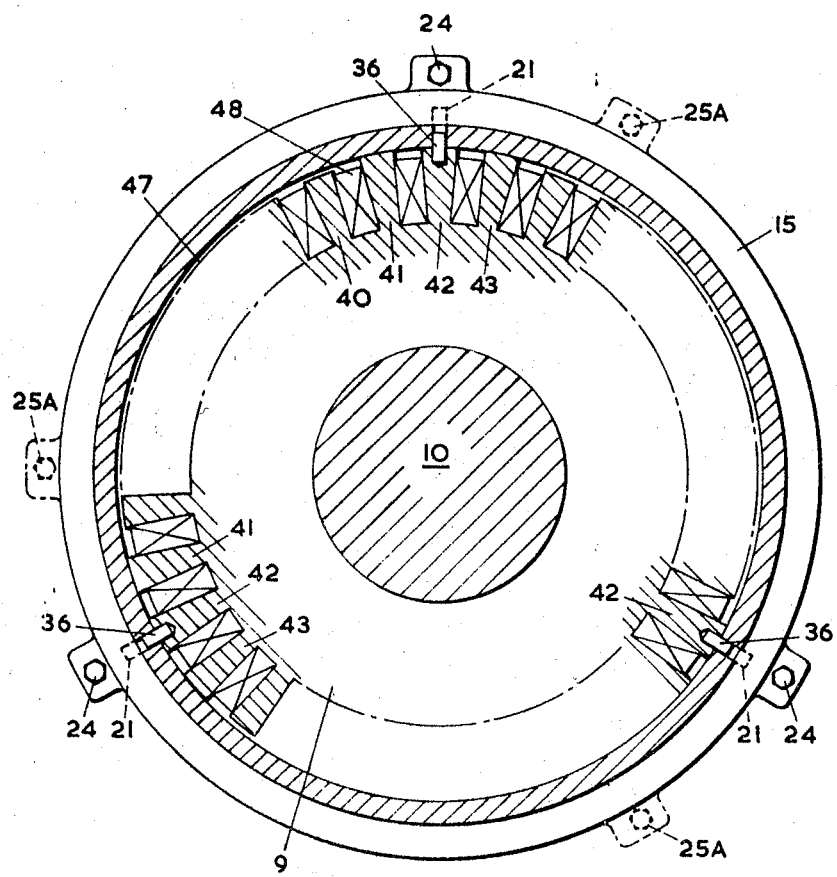

One form of six pole alternating current generator having a rotating armature will now be described, by way of example, with reference to the accompanying diagrammatic drawings, in which:

FIG. 1 is a cross section through part of one end of the armature of the generator in accordance with the invention and shows the winding end turns; and FIG. 2 shows relevant details of a section through a complete armature of the kind shown in FIG. 1 on the line A—A thereof.

In FIG. 1 the reference 10 denotes the shaft of the six pole armature part of the body of which is shown at 11 with an annular end plate 9 and the end turns 13 of the armature winding are shown extending beyond the end of the armature body. The end turns are surrounded by insulation 14 and are secured against the action of centrifugal force by four annular metal ring members 15, 16, 17 and 18.

The innermost member 15 is shrunk onto the end ring 9 and is held in position by three dowel pins 36 spaced apart 120° from one another as can be seen in FIG. 2 which also shows the construction of the armature end plate 9 as having three sets of teeth as, for example, shown at 41, 42, 43 which are also spaced 120° apart from one another and which are slightly longer than the other teeth of the end ring. One of these other shorter teeth is shown, for example, at 40 and the armature windings in the slots between the teeth are shown at 48.

The member 15 has three sets of inner annular surfaces one set of which are shown at 49, 50, 51 (FIG. 1) and each set of surfaces is spaced apart 120°. Each surface 51 rests on a respective one of the three sets of longer teeth at 41, 42, 43. Each surface 49 abuts the end face of the end plate 9, and each surface 50 closely surrounds the insulation 14 which is disposed about the end turns 13.

The outermost member 18 is supported on a diaphragm 19 which is secured to a ring 20, in turn secured to the shaft 10. The member 18 is held in position by three dowel pins also spaced 120° apart from one another, one such pin 37 being shown in FIG. 1. The inner surface 54 of the member 18 closely surrounds the insulation 14.

Electrical and mechanical contact between the ring 18 and the diaphragm 19 can be continuous around the abutting surface of these members or it can be limited to relatively small areas around the dowel pins 37.

Between the inner and outer members 15 and 18 the two members 16 and 17 have inner surfaces 52 and 53 which also closely surround the insulation 14 and these two members are bolted to one another and to the adjacent members 15 and 18 by three bolts and nuts 24, three bolts and nuts 25 and three bolts and nuts 16 with insulation 27, 28 and 29 between adjacent annular members.

As can be seen in FIG. 2 the bolts 24 are also spaced apart at 120° from one another and the bolts and nuts 25, 26 are similarly spaced.

The pairs of members 15 and 16, 16 and 17 and 17 and 18 are located relative to one another by three respective sets of three dowel pins 21, 22, 23 with the pins of each set also spaced apart 120°. The three pins 21 are indicated in broken lines in FIG. 2.

It will be noted that in the armature, which has six poles the members 15 to 18 are secured to one another and the members 15 and 18 are secured to the armature body and shaft at three locations all spaced 120° apart. This arrangement substantially reduces the eddy currents which can flow both between the armature body and members and between the individual members and thus reduces the heat developed in the members.

For an armature having fewer or more poles the ratio of poles to symmetrically spaced points at which the annular members are secured together, is the same, that is, 2:1 and the number of points at which any annular member is secured to the armature body is of the same order, as is the number of points at which one annular member is located relative to the or each adjacent such member.

Whilst the invention has been described in relation to an arrangement in which three sets of locating points at which one member makes contact with the next adjacent member or members, or the armature body are all in alignment, this arrangement is not essential. For example, the location at which the member 16 is secured to the member 17 by the nuts and bolts 25 can be displaced relative to the similar bolt locations between the members 17 and 18 providing that in each case the bolts are spaced 120° from one another.

An alternative position 25A for the bolts and nuts 25 is shown in broken lines in FIG. 2.

In addition the members can be secured to one another at additional locations and any member also secured to the armature body at additional locations but at these locations the member of any member and the armature body will have to be electrically insulated from one another.

In so far as there may be nodal points in the eddy currents patterns of the eddy currents flowing in the member the members are preferably secured to one another, and any member secured to the armature body at these nodal points providing they allow locating points to be of the necessary number and symmetrically spaced as described.

The annular members for securing the end windings at the other end of the armature body will be as described above.

We claim:

1. An alternating current generator having a rotatable armature with armature winding end turns which extend axially beyond the armature body and a plurality of axially distributed metal retaining rings surrounding the end turns, means for securing the plurality of rings directly together to make electrical contact with one another only at a number of symmetrically spaced locations which are equal in number to half the number of poles of the armature winding, and means for securing the axially innermost one of the retaining rings directly to the armature body to make electrical contact therewith only at a number of symmetrically spaced locations which are also equal in number to half the number of poles of the armature winding.

2. A generator according to claim 1 including means for supporting the axially outermost ring from the armature shaft.

3. A generator according to claim 1 including means for supporting the axially outermost ring at a number of symmetrically spaced locations equal to half the number of poles of the armature winding so that the outermost ring makes electrical contact with said support means only at said symmetrically spaced locations.

4. A generator according to claim 1 in which the locations at which a ring makes electrical contact with one adjacent ring are not in alignment with the locations at which it makes electrical contact with another adjacent ring.

5. A generator according to claim 1 in which the locations at which one ring makes electrical contact with an adjacent ring are substantially at nodal points in the eddy current patterns of eddy currents which will flow in the rings.

6. A generator according to claim 1 in which the locations at which the radially innermost ring makes contact with the stator body are substantially at nodal points in the eddy current patterns of eddy currents which will flow in the rings.

7. An alternating current generator according to claim 1 in which the rings are secured together at one or more further locations by means which are electrically insulated from the rings.

8. An alternating current generator according to claim 1 in which the axially innermost ring is secured to the armature body at one or more further locations by means which are electrically insulated from that ring and the armature body.

References Cited

UNITED STATES PATENTS 2,796,540   6/1957   Barlow _____ 310—270

FOREIGN PATENTS 659,090   4/1937   Germany.

WARREN E. RAY, Primary Examiner

R. SKUDY, Assistant Examiner